United States Patent
Manno et al.

(10) Patent No.: US 7,735,534 B2
(45) Date of Patent: Jun. 15, 2010

(54) HEAVY DUTY PNEUMATIC TIRE WITH BELT HARD RUBBER LAYER

(75) Inventors: Akira Manno, Kobe (JP); Yukihide Oya, Kobe (JP); Hideaki Yoshikawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 575 days.

(21) Appl. No.: 11/806,182

(22) Filed: May 30, 2007

(65) Prior Publication Data
US 2008/0000566 A1    Jan. 3, 2008

(30) Foreign Application Priority Data
Jun. 28, 2006    (JP) .............................. 2006-177519

(51) Int. Cl.
*B60C 3/04*     (2006.01)
*B60C 9/18*     (2006.01)
*B60C 9/22*     (2006.01)

(52) U.S. Cl. .................. 152/454; 152/531; 152/532; 152/533; 152/534

(58) Field of Classification Search ............. 152/454, 152/531–534
See application file for complete search history.

(56) References Cited

U.S. PATENT DOCUMENTS 5,154,217 A    10/1992    Kanamaru
5,772,810 A *  6/1998    Cluzel ................. 152/531
6,082,425 A    7/2000    Colom
6,401,778 B1   6/2002    Cluzel
7,575,031 B2 * 8/2009    Manno et al. ........ 152/531

FOREIGN PATENT DOCUMENTS

| CN | 1211216 A | 3/1999 |
|---|---|---|
| EP | 1 787 825 A1 * | 5/2007 |
| JP | 2-141309 A | 5/1990 |
| JP | 2006069283 A * | 3/2006 |
| JP | 2006-111219 A | 4/2006 |

* cited by examiner

*Primary Examiner*—Adrienne C Johnstone
(74) *Attorney, Agent, or Firm*—Birch, Stewart, Kolasch & Birch, LLP

(57) ABSTRACT

A tire 2 has a belt 14 and a hard rubber layer 16. The belt 14 has a first ply 26, a second ply 28, a third ply 30 and a fourth ply 32. A width W3 of the third ply 30 is smaller than a width W1 of the first ply 26 and a width W2 of the second ply 28, and 75% of a width of a tread. Each of the plies 26, 28, 30, 32 has a steel cord. The first ply 26 and the second ply 28 construct a cross-ply structure. A cord of the third ply 30 is wound spirally. The third ply 30 has what is referred to as a jointless structure. The hard rubber layer 16 is positioned between the first ply 26 and the second ply 28, and outward of the third ply 30 in an axial direction. A complex elastic modulus of the hard rubber layer 16 is equal to or greater than 30 MPa.

5 Claims, 2 Drawing Sheets

HEAVY DUTY PNEUMATIC TIRE WITH BELT HARD RUBBER LAYER

This application claims priority on Patent Application No. 2006-177519 filed in JAPAN on Jun. 28, 2006, the entire contents of which are hereby incorporated by reference.

BACKGROUND OF THE INVENTION

1. Field of the Invention

The present invention relates to a heavy duty pneumatic tire to be attached to a heavy load vehicle such as trucks and buses. More particularly, the present invention relates to a pneumatic tire whose carcass has a radial structure.

2. Description of the Related Art

Heavy duty tires having a radial structure are known. JP-A No. 2-141309 has disclosed a heavy duty tire having a belt ply including a cord which extends in a circumferential direction. U.S. Pat. No. 6,082,425 (JP-A No. 2000-504655) has disclosed a heavy duty radial tire having a belt ply including a cord which extends in a circumferential direction and a belt ply with a bias structure. U.S. Pat. No. 6,401,778 (JP-A No. 2001-522748) has disclosed a heavy duty radial tire having a belt ply including a cord which extends in a circumferential direction and a belt ply with a bias structure.

Dimensions of a tire are enlarged gradually according to mileage of the car. By this enlargement, a tread profile is deformed. The deformation causes uneven wear of the tread. The deformation may cause cracks at a bottom part of a groove formed on the tread. In heavy duty tires having a radial structure and a small aspect ratio, uneven wear and cracks are caused significantly.

In tires with enlarged dimensions, contact pressure on a shoulder part is great. While running, frictional heat is generated resulting from the great contact pressure. By the frictional heat, a belt ply may be separated at the end of the ply. The enlargement of dimensions deteriorates durability of tires.

The object of the present invention is to provide a heavy duty pneumatic tire in which excellent quality can be maintained for a long term.

SUMMARY OF THE INVENTION

A heavy duty pneumatic tire according to the present invention comprises a tread having an external surface to form a tread surface, a pair of side walls extending almost inward in a radial direction from each end of the tread, a pair of beads positioned almost inward of the sidewalls in the radial direction, a carcass laid between both of the beads along insides of the tread and the sidewalls and having a radial structure, a belt positioned between the tread and the carcass, and a hard rubber layer. The belt includes a first ply, a second ply and a third ply positioned between the first ply and the second ply. The first ply and the second ply include a cord which is formed by a non-extensible material and has an absolute value of an angle to a circumferential direction being 10° or greater and 45° or less. Inclination of the cord of the first ply to the circumferential direction is reverse to inclination of the cord of the second ply to the circumferential direction. The third ply includes a cord substantially extending in the circumferential direction. A width of the third ply is smaller than those of the first ply and the second ply, and is 75% or greater of a width of the tread. The hard rubber layer is positioned outward of the third ply in an axial direction and between the first ply and the second ply.

The tire according to the present invention, the third ply restrains the enlargement of dimensions. In this tire, uneven wear and cracks at a bottom part of a groove are not easily caused. In this tire, the hard rubber layer retrains a separation of the belt ply and a cutting of the belt cord. This tire is excellent in durability.

It is preferred that the hard rubber layer has a thickness of equal to or greater than 2.0 mm and a complex elastic modulus of 30 MPa or greater and 80 MPa or less. It is preferred that an outer end of the hard rubber layer is positioned inward of an end of the first ply and an end of the second ply. It is preferred that the cord of the third ply is formed by a non-extensible material. The effect of the present invention is shown significantly in a tire having an aspect ratio of equal to or less than 80%.

DESCRIPTION OF THE PREFERRED EMBODIMENTS

The present invention will be described below in detail based on preferred embodiments with reference to the drawings.

Figure 1:
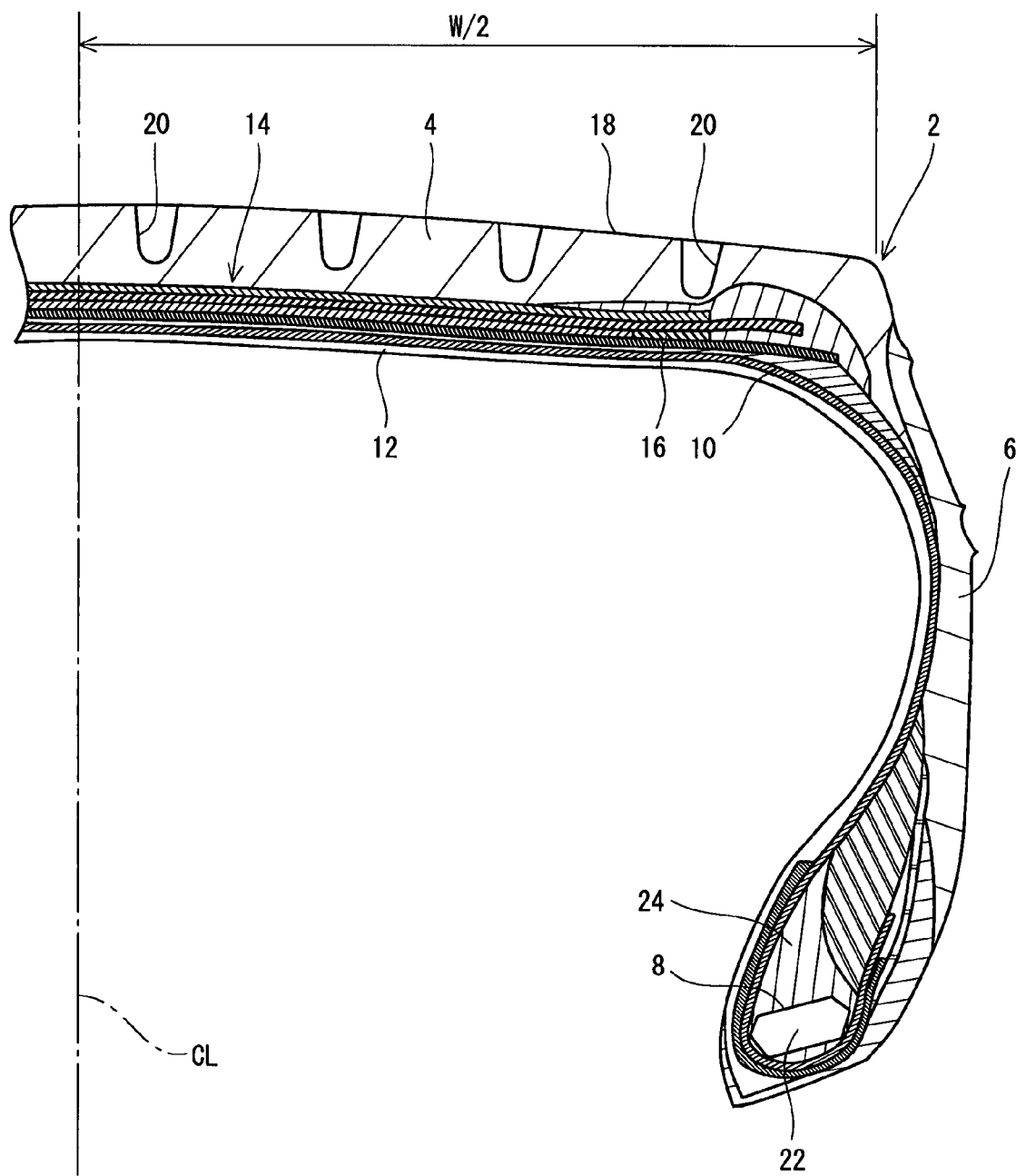
FIG. 1 is a sectional view showing a part of a heavy duty pneumatic tire according to an embodiment of the present invention.

In FIG. 1, a vertical direction is set to be a radial direction of a tire 2, a transverse direction is set to be an axial direction of the tire 2, and a perpendicular direction to the sheet is set to be a circumferential direction of the tire 2. The tire 2 takes an almost symmetrical shape about a one-dotted chain line CL in FIG. 1. This one-dotted chain line CL indicates an equator plain of the tire 2. This tire 2 has a tread 4, a sidewall 6, a bead 8, a carcass 10, an inner liner 12, a belt 14, and a hard rubber layer 16. This tire 2 is a tubeless type tire.

The tread 4 is formed by a crosslinked rubber which is excellent in abrasion resistance. The tread 4 has a shape which is outwardly convex in the radial direction. The tread 4 has a tread surface 18. The tread surface 18 comes in contact with a road surface. On the tread surface 18, a groove 20 is carved. With this groove 20, a tread pattern is formed.

The sidewall 6 extends almost inward in the radial direction from each end of the tread 4. The sidewall 6 is formed by a crosslinked rubber. The sidewall 6 bends to absorb a shock from the road surface. In addition, the sidewall 6 prevents an external damage to the carcass 10.

The bead 8 is positioned almost inward of the sidewall 6 in the radial direction. The bead 8 has a core 22 and an apex 24 which extends outward in the radial direction from the core 22. The core 22 is ring-shaped and includes a plurality of non-extensible wires (typically, steel wires). The apex 24 is tapered outwardly in the radial direction. The apex 24 is formed by a crosslinked rubber having high hardness.

The carcass 10 is laid between the beads 8 on both sides along the insides of the tread 4 and the sidewalls 6. The carcass 10 is turned up around the core 22 from inward to outward in the axial direction. The carcass 10 is formed by a cord and a topping rubber, which is not shown in the figure. An absolute value of an angle of the cord to the equator plane is 70° to 90°. In other words, this carcass 10 has a radial structure. A material for general cord is steel.

The inner liner 12 is bonded to an inner peripheral surface of the carcass 10. The inner liner 12 is formed by a crosslinked rubber. For the inner liner 12, a rubber which is excellent in air shielding capability is used. The inner liner 12 plays a part in keeping an inner pressure of the tire 2.

Figure 2:
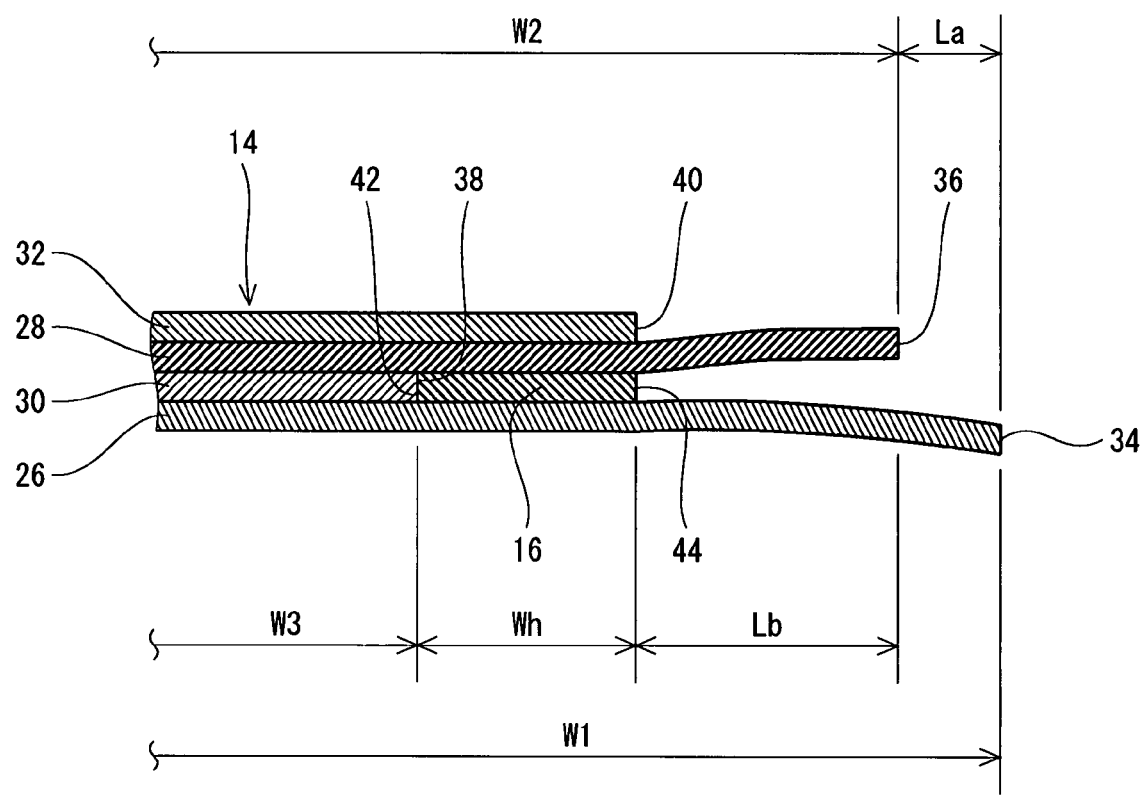
FIG. 2 is an enlarged view showing a part of a belt of the tire in FIG. 1 together with a hard rubber layer.

The belt 14 is positioned between the tread 4 and the carcass 10. FIG. 2 is an enlarged view showing a part of this belt 14 together with the hard rubber layer 16. The belt layer 14 has a first ply 26, a second ply 28, a third ply 30 and a fourth ply 32.

Although it is not shown in the figure, the first ply 26 is formed by a first cord and a topping rubber and the second ply 28 is formed by a second cord and a topping rubber. The first cord and the second cord are inclined to the circumferential direction. An absolute value of the inclination angle is 10° or greater and 45° or less. The inclination direction of the first cord is reverse to the inclination direction of the second cord. The first cord and the second cord are formed by a non-extensible material. A typical non-extensible material is steel. An end 34 of the first ply 26 is positioned outward of an end 36 of the second ply 28 in the axial direction.

The third ply 30 is positioned between the first ply 26 and the second ply 28. Although it is not shown in the figure, the third ply 30 is formed by a third cord and a topping rubber. The third cord is wound spirally. The third cord substantially extends in the circumferential direction. An angle of the third cord to the circumferential direction is equal to or less than 3°. The third ply 30 has what is referred to as a jointless structure. An end 38 of the third ply 30 is positioned inward of the end 34 of the first ply 26 in the axial direction. An end 38 of the third ply 30 is positioned inward of the end 36 of the second ply 28.

It is preferred that the third cord is formed by a non-extensible material. A typical non-extensible material is steel. Illustrative examples of the type of the steel cord include "3×7×0.22" and "3×7×0.27". Density of the third cord is preferably 15 ends/5 cm or greater 35 ends/5 cm or less, and more preferably 20 ends/5 cm or greater 30 ends/5 cm or less. When the "3×7×0.22" type steel cord is used, preferable density is 26 ends/5 cm or greater and 30 ends/5 cm or less. When the "3×7×0.27" type steel cord is used, preferable density is 20 ends/5 cm or greater and 24 ends/5 cm or less.

Since the third ply 30 has the Pointless structure, the carcass 10 is bound firmly. By this third ply 30, enlargement of dimensions of the tire 2 is restrained. By the restraint of the enlargement, uneven wear and cracks at a bottom part of the groove 20 is restrained. The third ply 30 is responsible for durability of the tire 2.

The fourth ply 32 is layered on the second ply 28. Although it is not shown in the figure, the fourth ply 32 is formed by a fourth cord and a topping rubber. The fourth ply 32 is inclined to the circumferential direction. An absolute value of an inclination angle is 10° or greater and 45° or less. The fourth cord is formed by a non-extensible material. A typical non-extensible material is steel. An end 40 of the fourth ply 32 is positioned inward of the end 34 of the first ply 26. An end 40 of the fourth ply 32 is positioned inward of the end 36 of the second ply 28.

The hard rubber layer 16 is positioned between the first ply 26 and the second ply 28. The hard rubber layer 16 is positioned outward of the third ply 30 in the axial direction. An inner end 42 of the hard rubber layer 16 abuts on the end 38 of the third ply 30. An outer end 44 of the hard rubber layer 16 is positioned inward of the end 34 of the first ply 26 in the axial direction. The outer end 44 of the hard rubber layer 16 is positioned inward of the end 36 of the second ply 28.

When a load is applied on the tire 2, shear strain is caused on the first ply 26 and the second ply 28 in a direction toward which an angle of the cord is getting smaller. Resulting from this strain, tension is applied on the third cord in the vicinity of the end 38 of the third ply 30. As the tire 2 rolls, the tension shifts. This shift of the tension triggers off a cutting of the third cord. The hard rubber layer 16 restrains the strain of the first ply 26 and the second ply 28 in the vicinity of the hard rubber layer 16. The hard rubber layer 16 reduces tension on the third cord. The hard rubber layer 16 prevents a cutting of the third cord. The hard rubber layer is responsible for durability of the tire 2.

In light of preventing the cutting of the third cord, a complex elastic modulus of the hard rubber layer 16 is preferably greater than that of a topping rubber of the third ply 30. The hard rubber layer 16 has a complex elastic modulus of preferably equal to or greater than 30 MPa, and more preferably equal to or greater than 40 MPa. A complex elastic modulus of the hard rubber layer 16 is preferably equal to or less than 80 MPa. By providing the hard rubber layer 16 having a complex elastic modulus of equal to or less than 80 MPa, heat generation while rolling is restrained. The restraint of heat generation is responsible for durability of the tire 2. In light of durability, the hard rubber layer 16 has a complex elastic modulus of preferably equal to or less than 70 MPa.

A complex elastic modulus E* is measured with a viscoelastic spectrometer ("VESF-3", available from IWAMOTO SEISAKUSHO Co., LTD.) in conformity to a rule defined by "JIS-K 6394" under the following condition.

Initial strain: 10%
Amplitude: 1% (one-side amplitude)
Frequency: 10 Hz
Deformation mode: Tension
Starting temperature: −100° C.
Ending temperature: 100° C.
Temperature rising rate: 3° C./min
Temperature at measurement: 70° C.

For the measurement with the viscoelastic spectrometer, a specimen is provided. The specimen has a shape of plate, a length of 45 mm, a width of 4 mm and a thickness of 2 mm. The specimen is chucked at both ends thereof to carry out the measurement. The specimen has a displacement part with a length of 30 mm. From the same composition as the hard rubber layer 16, a slab with a thickness of 2 mm is formed and crosslinked through a mold and the specimen is punched out from the slab. The slab is formed and crosslinked at 160° C. for 10 minutes.

A thickness of the hard rubber layer 16 is preferably equal to or greater than 2.0 mm. The hard rubber layer 16 sufficiently restrains a strain of the first ply 26 and the second ply 28. In this respect, the thickness is preferably equal to or greater than 2.5 mm. The thickness is preferably equal to or less than 4.0 mm.

In FIG. 2, what is indicated by a both-sided arrowhead W1 is a width of the first ply 26. The width W1 is a distance from the end 34 to the other end (not shown) in the axial direction. A proportion of a width W1 to the width W of the tread 4 (see FIG. 1) is preferably equal to or greater than 85%. The first ply 26 having this proportion of equal to or greater than 85% binds the carcass 10 sufficiently. In this respect, the proportion is more preferably equal to or greater than 90%. The proportion is preferably equal to or less than 103%.

In FIG. 2, what is indicated by a both-sided arrowhead W2 is a width of the second ply 28. The width W2 is a distance from the end 36 to the other end (not shown) in the axial direction. A proportion of a width W2 to the width W of the tread 4 is preferably equal to or greater than 85%. The second ply 28 having this proportion of equal to or greater than 85% binds the carcass 10 sufficiently. In this respect, the proportion is more preferably equal to or greater than 87%. The proportion is preferably equal to or less than 98%.

In FIG. 2, what is indicated by a both-sided arrowhead W3 is a width of the third ply 30. The width W3 is a distance from the end 38 to the other end (not shown) in the axial direction. A proportion of a width W3 to the width W of the tread 4 is preferably equal to or greater than 75%. The third ply 30 having this proportion of equal to or greater than 75% restrains enlargement of the tire 2. In this respect, the proportion is more preferably equal to or greater than 77%. The proportion is preferably equal to or less than 85%.

In FIG. 2, what is indicated by an arrowhead La is a distance between the end 34 of the first ply 26 and the end 36 of the second ply 28 in the axial direction. The distance La is preferably equal to or greater than 7 mm. In the belt 14 having the distance La of equal to or greater than 7 mm, separation of the second ply 28 is not easily caused. In this respect, the distance La is more preferably equal to or greater than 9 mm. The distance La is preferably equal to or less than 12 mm.

In FIG. 2, what is indicated by an arrowhead Wh is a width of the hard rubber layer 16. The width Wh is a distance from the inner end 42 to the outer end 44 in the axial direction. The width Wh is preferably equal to or greater than 10 mm. The hard rubber layer 16 having the width Wh of equal to or greater than 10 mm sufficiently restrains a strain of the first ply 26 and the second ply 28. In this respect, the width Wh is more preferably equal to or greater than 20 mm. The width Wh is preferably equal to or less than 40 mm.

In the vicinities of the end 34 of the first ply 26 and the end 36 of the second ply 28, great strain is caused by an applied load. When the hard rubber layer 16 is present in the vicinity of the ends 34 and 36, heat is greatly generated while rolling. In this tire 2, the outer end 44 of the hard rubber layer 16 is positioned inward of the end 34 of the first ply 26 in the axial direction, and positioned inward of the end 36 of the second ply 28 in the axial direction. In this tire 2, generation of heat is restrained. In FIG. 2, what is indicated by an arrowhead Lb is a distance between the end 36 of the second ply 28 and the outer end 44 of the hard rubber layer 16 in the axial direction. In light of restraint of heat generation, the distance Lb is preferably equal to or greater than 2 mm, more preferably equal to or greater than 5 mm. In light of restraint of a cutting of the first cord and the second cord, the distance Lb is preferably equal to or less than 20 mm, and more preferably equal to or less than 15 mm.

The present invention shows a great effect in the tire 2 having an aspect ratio of equal to or less than 80%. The present invention shows a significant effect in the tire 2 having an aspect ratio of equal to or less than 50%.

When measuring dimensions and angles of each member of the tire 2, the tire 2 is fitted into a normal rim and filled with air to have a normal internal pressure. Under the measurement, a load is not applied on the tire 2. In the present specification, the normal rim means a rim provided by a standard system including standards of the tire 2. A "standard rim" in JATMA standards, a "Design Rim" in TRA standards and a "Measuring Rim" in ETRTO standards are included in the normal rim. In the present specification, a normal internal pressure means an internal pressure provided by a standard system including standards of the tire 2. A "maximum air pressure" in the JATMA standards, a "maximum value" described in "TIRE LOAD LIMITS AT VARIOUS COLD INFLATION PRESSURE" in the TRA standards, and "INFLATION PRESSURE" in the ETRTO standards are included in the normal internal pressure.

EXAMPLES

Experiment 1

Example 1

A heavy duty tire having a structure shown in FIGS. 1 and 2 was obtained. The size of the tire is "435/45R22.5". This tire has a tread having a width of 374 mm. The tread has a groove having a depth of 13.5 mm. A proportion of a width W1 of a first ply to a width W is 99.4%. A proportion of a width W2 of a second ply to the width W is 95.7%. A proportion of a width W3 of a third ply to the width W is 77%. A distance La is 7 mm. The first ply includes a steel cord which has an angle to a circumferential direction of +18°. The second ply and a fourth ply include a steel cord which has an angle to the circumferential direction of −18°. The third ply includes a steel cord substantially extending in the circumferential direction. This tire has a hard rubber layer formed by a rubber composition being crosslinked. This rubber composition includes 100 parts by weight of natural rubber, 70 parts by weight of carbon black, 2.0 parts by weight of sulfur, 2.0 parts by weight of vulcanization accelerator (Ns), 1.0 part by weight of vulcanization coagent (HMT) and 18 parts by weight of phenol resin. A complex elastic modulus of the hard rubber layer is 54. This hard rubber layer has a thickness of 2.5 mm and a width Wh of 20 mm.

Examples 4 to 6

Tires according to examples 4 to 6 were obtained in the same manner as in the example 1 except that the thickness of the hard rubber layer was set as shown in the following table 1.

Examples 3 and 7 to 8

Tires according to examples 3 and 7 to 8 were obtained in the same manner as in the example 1 except that the second ply having a short width W2 was provided and the distance La was set as shown in the following table 1.

Example 2 and Comparative Example 1

Tires according to example 2 and comparative example 1 were obtained in the same manner as in the example 1 except that the third ply having a short width W3 was provided.

Comparative Example 2

A tire according to a comparative example 2 was obtained in the same manner as in the example 1 except that a belt was formed by the following four plies and the hard rubber layer was not provided.

First ply: including steel cord having an angle to the circumferential direction of +18°

Second ply: including steel cord having an angle to the circumferential direction of −18°

Third ply: including steel cord having an angle to the circumferential direction of +18°

Fourth ply: including steel cord having an angle to the circumferential direction of −18°

[Driving Test]

A tire was fitted to a rim having a size of "14.00×22.5" and filled with air to have a normal internal pressure. The tire was attached to a driving test machine and applied a load which is 1.4 times the maximum load defined by standards. This tire was run on a drum of the driving test machine at a speed of 30 km/h. When the mileage got to 30000 km, the run was stopped and breaks of the third cord, uneven wear of the tread, cracks and separation length (length in the axial direction) of the second ply were checked. The results are shown in the following table 1. In the table 1, the degree of uneven wear resistance of the tread is shown as an index setting an index number for the result of the comparative example 1 to be 100.

TABLE 1

Results of Evaluation

|  |  | Compa. Example 1 | Example 2 | Example 3 | Example 4 | Example 5 | Example 1 | Example 6 | Example 7 | Example 8 | Compa. Example 2 |
|---|---|---|---|---|---|---|---|---|---|---|---|
| Belt | Type | FIG. 2 | FIG. 2 | FIG. 2 | FIG. 2 | FIG. 2 | FIG. 2 | FIG. 2 | FIG. 2 | FIG. 2 | * |
|  | (W3/W) · 100 (%) | 73 | 75 | 77 | 77 | 77 | 77 | 77 | 77 | 77 | — |
|  | La (mm) | 7 | 7 | 5 | 7 | 7 | 7 | 7 | 10 | 13 | — |
| Hard rubber layer | Complex elastic modulus | 54 | 54 | 54 | 54 | 54 | 54 | 54 | 54 | 54 | — |
|  | Thickness (mm) | 2.5 | 2.5 | 2.5 | 1.5 | 2.0 | 2.5 | 3.0 | 2.5 | 2.5 | — |
|  | Width Wh (mm) | 20 | 20 | 20 | 20 | 20 | 20 | 20 | 20 | 20 | — |
| Break of third cord |  | No | No | No | No | No | No | No | No | No | — |
| Uneven wear resistance of tread |  | 100 | 125 | 150 | 150 | 150 | 150 | 150 | 150 | 150 | 100 |
| Cracks at bottom part of groove |  | No | No | No | No | No | No | No | No | No | Caused |
| Separation length of second ply (mm) |  | 0 | 0 | 10 | 10 | 0 | 0 | 0 | 0 | 5 | 0 |

* Four cut plies

As shown in the table 1, on the tires according to the examples, breaks are not caused and uneven wear and cracks are restrained.

Experiment 2

Examples 11 to 13

Tires according to examples 11 to 13 were obtained in the same manner as in the example 1 except that a width Wh of the hard rubber layer was set as shown in the following table 2. In the tire of example 13, an outer end of the hard rubber layer is positioned outward of an end of the second ply in the axial direction.

Examples 9 to 10 and 14 to 16

Tires according to examples 9 to 10 and 14 to 16 were obtained in the same manner as in the example 1 except that an amount of phenol resin was changed and the complex elastic modulus of the hard rubber layer was set as shown in the following table 2.

Comparative Example 3

A tire according to comparative example 3 was obtained in the same manner as in the example 1 except that the hard rubber layer was not provided.

[Driving Test]

A driving test was carried out in the same manner as the driving test of the experiment 1 and breaks of the third cord were checked. The results are shown in the following table 2.

[Durability Test]

Using the same machine as that of the driving test above, a tire was run at a speed of 70 km/h for two hours. Then the tire was run at a speed of 80 km/h for two hours. Afterward, the run was continued in the same way adding a speed of 10 km/h every two hours. The total running time until the tire was broken was measured. The results are shown in the following table 2 as an index setting an index number for the result of the comparative example 3 to be 100.

TABLE 2

Results of Evaluation

|  |  | Example 9 | Example 10 | Example 11 | Example 1 | Example 12 | Example 13 | Example 14 | Example 15 | Example 16 | Compa. Example 3 |
|---|---|---|---|---|---|---|---|---|---|---|---|
| Belt | Type | FIG. 2 | FIG. 2 | FIG. 2 | FIG. 2 | FIG. 2 | FIG. 2 | FIG. 2 | FIG. 2 | FIG. 2 | FIG. 2 |
|  | (W3/W) · 100 (%) | 77 | 77 | 77 | 77 | 77 | 77 | 77 | 77 | 77 | 77 |
|  | La (mm) | 7 | 7 | 7 | 7 | 7 | 7 | 7 | 7 | 7 | 7 |
| Hard rubber layer | Phenol resin (parts by weight) | 10 | 12 | 18 | 18 | 18 | 18 | 23 | 30 | 35 | — |
|  | Complex elastic modulus | 30 | 40 | 54 | 54 | 54 | 54 | 69 | 80 | 90 | — |
|  | Thickness (mm) | 2.5 | 2.5 | 2.5 | 2.5 | 2.5 | 2.5 | 2.5 | 2.5 | 2.5 | — |
|  | Width Wh (mm) | 20 | 20 | 10 | 20 | 30 | 40 | 20 | 20 | 20 | — |
| Break of third cord |  | No | No | No | No | No | No | No | No | No | Caused |
| Durability |  | 100 | 103 | 105 | 105 | 100 | 90 | 103 | 100 | 90 | 100 |

As shown in the table 2, on the tires according to the examples, breaks of the third cord are not caused. From the results of the evaluation, the advantages of the present invention are apparent.

The above description is only illustrative and various changes can be made without departing from the scope of the present invention.

What is claimed is:

1. A heavy duty pneumatic tire comprising a tread having an external surface to form a tread surface, a pair of sidewalls extending almost inward in a radial direction from each end of the tread, a pair of beads positioned almost inward of the sidewalls in the radial direction, a carcass laid between both of the beads along insides of the tread and the sidewalls and having a radial structure, a belt positioned between the tread and the carcass, and a hard rubber layer, the belt having a first ply, a second ply and a third ply positioned between the first ply and the second ply, the first ply and the second ply including a cord which is formed by a non-extensible material and has an absolute value of an angle to a circumferential direction being 10° or greater and 45° or less, an inclination of the cord of the first ply to the circumferential direction being reverse to an inclination of the cord of the second ply to the circumferential direction, the third ply including a cord substantially extending in the circumferential direction, a width of the third ply being smaller than those of the first ply and the second ply, and being 75% or greater of a width of the tread, and the hard rubber layer having a complex elastic modulus of 30 MPa or greater and 80 MPa or less and being positioned outward of the third ply in an axial direction and between the first ply and the second ply.

2. The tire according to claim 1, wherein the hard rubber layer has a thickness of equal to or greater than 2.0 mm.

3. The tire according to claim 1, wherein an outer end of the hard rubber layer is positioned inward of an end of the first ply and an end of the second ply in the axial direction.

4. The tire according to claim 1, wherein the cord of the third ply is formed by a non-extensible material.

5. The tire according to claim 1, wherein an aspect ratio thereof is equal to or less than 80%.

* * * * *